United States Patent [19]

DePue

[11] 4,270,733
[45] Jun. 2, 1981

[54] CABLE RACKING SYSTEM
[75] Inventor: Harold F. DePue, Novato, Calif.
[73] Assignee: Hydraulic Energy Company, San Rafael, Calif.
[21] Appl. No.: 957,544
[22] Filed: Nov. 3, 1978
[51] Int. Cl.³ .............................................. B66F 3/24
[52] U.S. Cl. ................................................ 254/93 R
[58] Field of Search ..................... 254/51, 93 R, 93 H, 254/134.3 R; 72/705; 405/282

[56] References Cited
U.S. PATENT DOCUMENTS

| 2,200,133 | 5/1940 | Mandl . | |
| 2,483,239 | 9/1949 | Sharpe . | |
| 3,054,596 | 9/1962 | Carr | 254/93 R |
| 3,062,502 | 11/1962 | Pelletier . | |
| 3,084,909 | 4/1963 | Carr | 254/93 R |
| 3,330,602 | 7/1967 | Riley et al. | 254/93 R |
| 3,345,039 | 10/1967 | Gray | 254/93 R |
| 3,891,182 | 6/1975 | Bearden . | |

Primary Examiner—Robert C. Watson

[57] ABSTRACT

A cable racking system for bending and holding in place large wires or cables which includes a jack having a double-acting hydraulic cylinder and three-way control valve means mounted on the cylinder to supply hydraulic fluid in one mode to extend or retract a piston rod mounted cable seat with precise control and in a another mode to hold pressure on the hydraulic cylinder so as to maintain any desired condition of piston rod extension.

1 Claim, 4 Drawing Figures

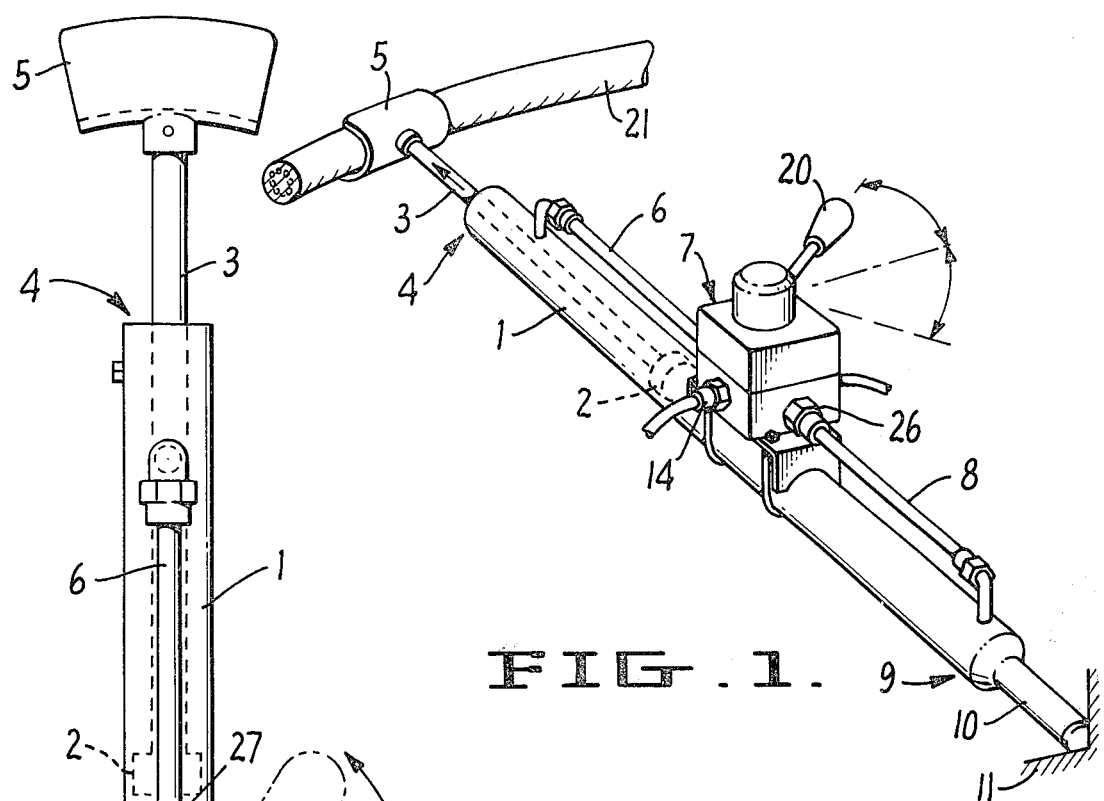
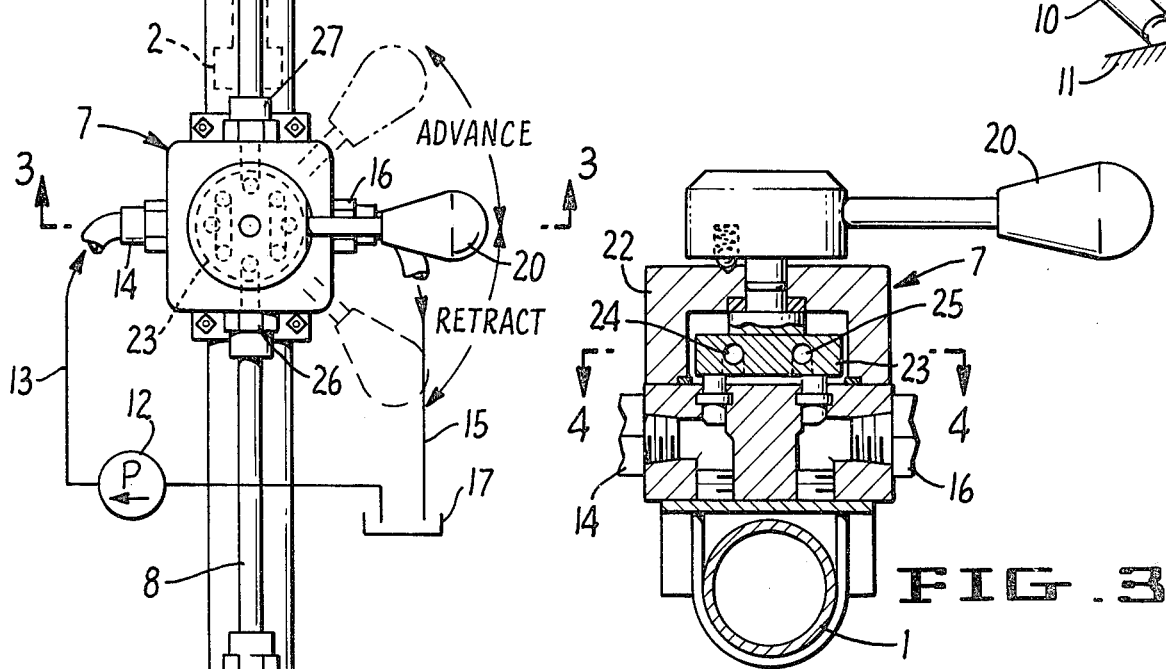
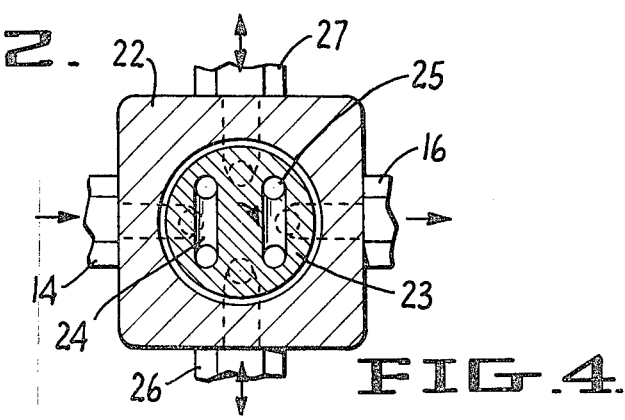

CABLE RACKING SYSTEM

BACKGROUND OF THE INVENTION

Hydraulic jacks have been used for a number of purposes including emergency rescue devices of the type illustrated in U.S. Pat. No. 3,891,187 issued June 24, 1975 on "Portable Rescue Device" and U.S. Pat. No. 2,200,133 issued May 7, 1940 for "Method and Means for Straightening Out Deformed Automobile Bodies and the Like". Other jacks have been used for pushing and pulling services such as the one disclosed in U.S. Pat. No. 2,483,239 issued Sept. 27, 1949 for "Multiple Pressure Fluid Motor Mechanism for Pushing and Pulling" or for stretching or tightening cables such as the one illustrated in U.S. Pat. No. 3,062,502 issued Nov. 6, 1962 for "Tightening Device for Cables, Chains and the Like Elongated Flexible Elements".

SUMMARY OF THE INVENTION

The system of this invention is particularly adapted for bending heavy cables in the crowded confines of underground vaults or tunnels both to shape the cables or move them into place with precise control and then to hold them in position while the cables are connected or otherwise fastened in place.

The system includes a jacking tool utilizing a double acting hydraulic cylinder with integral control valve means to hydraulically manipulate a piston rod mounted cable seat with precise directional control. The valve means in a second mode maintains the condition of piston rod extension whether connected to the source of hydraulic pressure or not.

A principal object of this invention is to provide a jacking tool for guiding heavy electrical and telephone cables into the desired configuration or position with precise directional control in essentially a one man operation.

Another object of the invention is to provide a cable jacking tool capable of maintaining a given condition of piston rod extension with the source of hydraulic pressure either connected to or disconnected from the tool at the option of the operator.

Other objects and advantages of the system will become apparent upon consideration of the following description of a specific embodiment illustrated in the accompanying drawings wherein FIG. 1 is a perspective view of the jacking tool shown with its piston rod extending to move a heavy telephone cable into position;

FIG. 2 is a top view of the tool with the hydraulic system shown schematically and also illustrating the several control valve positions;

FIG. 3 is a sectional view of the jacking tool taken along line 3—3 of FIG. 2; and FIG. 4 is a sectional view of the control valve means taken along line 4—4 of FIG. 3.

The cable racking jack includes a hydraulic cylinder 1 which is double acting. The cylinder carries a piston 2 and has a piston rod 3 connected at one end to the piston and extending through a packed rod-end of the cylinder, designated as 4. The other end of the piston rod 3 carries a cable seat 5 outside the cylinder which has a generally curved channel shape. The cable seat 5 may be pinned to the free end of the piston rod as shown in FIG. 2. A first conduit means 6 communicates hydraulic fluid to and from the rod-end 4 of the cylinder via a control valve means referred to generally as 7. A second conduit means 8 communicates hydraulic fluid via control valve means 7 to and from the blind-end of the cylinder designated 9. The cylinder carries a foot 10 which, as illustrated in FIG. 1, is used to brace the tool at the blindend of cylinder 1 against a firm anchor such as the wall of an underground vault indicated schematically as 11.

The control valve means 7 controls hydraulic fluid supplied under pressure from pump means 12 through hose 13 to an inlet port 14. The illustrated hydraulic system is closed and includes a return hose 15 communicating return port 16 of the valve with a reservoir 17 of lower pressure. FIG. 2 illustrates schematically the hydraulic system.

The control valve 7 is a three way valve such as the 180 or 280 series manual control valves supplied by the Fluid Power Division of Webster Electric Company, Inc. of Racine, Wisconsin. The control valve means 7 has a handle 20 which in the "advance" position shown in FIG. 2 communicates high pressure hydraulic fluid through inlet port 14 and through second conduit means 8 into the cylinder 1 on the blind-end side the piston 2. Simultaneously the valve means exhausts hydraulic fluid from the rod-end side 4 through first conduit 6 and return port 16 to the reservoir 17. This advances the piston rod 3 out of the cylinder in the direction illustrated at FIG. 1 to push the heavy cable, such as telephone cable 21, into position.

Under positive pressure control, the cable can be maneuvered into position by pushing or retracting the piston rod as required. The latter is accomplished by moving the valve handle 20 to the "retract" position in FIG. 2. There high pressure fluid from inlet port 14 is communicated by the valve means 7 through first conduit means 6 into the cylinder on the rod-end side of the piston 2. Simultaneously fluid from the blind-end 9 of the cylinder flows through conduit 8 and return port 16 into the reservoir 17. In a neutral position shown in FIG. 2 the control valve means 7 communicates neither of conduits 6 or 8 to hydraulic fluid. In this position the closed hydraulic system can be disconnected from the inlet and return ports 14, 16 and moved to another tool as desired. The jack still holds its condition of piston rod extension and, hence, holds cable 21 in place while it is being attached or otherwise manipulated, for example, by other racking jacks to which hydraulic hoses 13, 15 then may be connected.

As illustrated, more particularly in FIGS. 3 and 4 the particular control valve means 7, shown by way of example, includes a valve body 22 having the inlet port 14 and return port 16. Within the valve body mounts a rotor 23 manipulated by the external handle 20. This rotor carries a pair of internal channels 24, 25 which in the neutral position shown in FIGS. 2, 3 and 4 communicate with nothing. In the "advance" position illustrated in FIG. 2 channel 24 communicates inlet port 14 with the port 26 to which second conduit means 8 connects which simultaneously rotor channel 25 connects return port 16 to port 27 to which the first conduit means 6 connects to exhaust hydraulic fluid from the rod-end of the cylinder. In the illustrated valve, a spring loaded ball detent arrangement 28 holds the lever 20 in one of its three positions.

The foregoing specific embodiment is described for illustrative purposes only. Variations in its exact construction will be apparent to those familiar with hydraulic tool art. The invention is defined in the following claims.

I claim:

1. A cable racking system comprising a double acting hydraulic cylinder having a piston, a packed rod-end and blind-end;

a piston rod connected at one end to the position and extending through the packed rod-end of the cylinder;

a cable seat mounted on the other end of the piston rod outside of said cylinder;

said seat being generally arcuately channel shaped and further defining a curved surface generated from a point axially inward from the rod end outside of said cylinder for supporting and retaining a section of cable in a curve while said rod is being extended;

an elongated foot mounted to the blind end of said cylinder for bracing said cylinder against an anchor;

first conduit means communicating hydraulic fluid to and from the cylinder on the rod-end side of the piston; second conduit means communicating hydraulic fluid to and from the cylinder on the blind-end side of the piston; a hydraulic system including pump means providing pressured hydraulic fluid at high pressure level and reservoir means for the hydraulic fluid at a lower pressure level;

control valve means mounted on the cylinder in one mode supplying high pressure hydraulic fluid to the cylinder at one side of the piston and simultaneously exhausting fluid from the other side of the piston to said reservoir in order to move said piston and piston rod assembly and in another mode holding existing pressure on both sides of the piston in order to maintain the condition of extension of the piston and piston rod assembly.

* * * * *